US012160809B2

(12) United States Patent
Shekhar et al.

(10) Patent No.: US 12,160,809 B2
(45) Date of Patent: Dec. 3, 2024

(54) FACILITATING USER EQUIPMENT TO USER EQUIPMENT COMMUNICATIONS IN A MOBILE NETWORK ENVIRONMENT

(71) Applicant: Cisco Technology, Inc., San Jose, CA (US)

(72) Inventors: Ravi Shekhar, Pune (IN); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 387 days.

(21) Appl. No.: 17/550,322

(22) Filed: Dec. 14, 2021

(65) Prior Publication Data

US 2023/0189115 A1    Jun. 15, 2023

(51) Int. Cl.
*H04W 40/12* (2009.01)
*H04W 40/04* (2009.01)
*H04W 48/18* (2009.01)

(52) U.S. Cl.
CPC .......... *H04W 40/04* (2013.01); *H04W 40/12* (2013.01); *H04W 48/18* (2013.01)

(58) Field of Classification Search
CPC ..... H04W 40/04; H04W 40/12; H04W 48/18; H04W 28/0268
See application file for complete search history.

(56) References Cited

U.S. PATENT DOCUMENTS

| 10,616,934 | B2 | 4/2020 | Talebi Fard et al. |
| 2019/0223055 | A1 | 7/2019 | Bor Yaliniz et al. |
| 2020/0053622 | A1 | 2/2020 | Huang-Fu et al. |
| 2020/0053828 | A1 | 2/2020 | Bharatia et al. |

(Continued)

FOREIGN PATENT DOCUMENTS

| ES | 2948309 T3 | 9/2023 |
| WO | 2017173259 A1 | 10/2017 |

(Continued)

OTHER PUBLICATIONS

3GPP, "3rd Generation Partnership Project; Technical Specification Group Services and System Aspects; Management and orchestration; 5G Network Resource Model (NRM); Stage 2 and stage 3 (Release 17 )", 3GPP TS 28.541 V17.2.1, Apr. 2021, 425 pages.

(Continued)

*Primary Examiner* — Lakeram Jangbahadur
(74) *Attorney, Agent, or Firm* — Edell, Shapiro & Finnan, LLC

(57) ABSTRACT

Presented herein are techniques to facilitate user equipment (UE) to UE communications in a mobile network environment. In one example, a method may include provisioning a UE route selection policy (URSP) for each of a first UE and a second UE, wherein each URSP provisioned for each of the first UE and the second UE comprises: a first token that identifies at least one network resource that is to be utilized for a session for each of the first UE and the second UE; and a second token associated with a quality of service (QoS) that is to be provided for each session. The first token can be used to establish a session for each of the first and second UE using the same at least network resource and each session can be provided a QoS level based on the second token.

20 Claims, 8 Drawing Sheets

(56) References Cited

U.S. PATENT DOCUMENTS

| | | | |
|---|---|---|---|
| 2020/0128503 A1 | 4/2020 | Li et al. | |
| 2020/0154350 A1 | 5/2020 | Dao et al. | |
| 2020/0187085 A1 | 6/2020 | Jagannatha et al. | |
| 2020/0221361 A1 | 7/2020 | Bae et al. | |
| 2020/0245381 A1 | 7/2020 | Talebi Fard et al. | |
| 2020/0367297 A1 | 11/2020 | Dao et al. | |
| 2021/0120596 A1 | 4/2021 | Youn et al. | |
| 2021/0219357 A1 | 7/2021 | Talebi Fard et al. | |
| 2021/0385633 A1 | 12/2021 | Wang et al. | |
| 2022/0166776 A1* | 5/2022 | Lee | H04L 63/0884 |
| 2022/0322202 A1* | 10/2022 | Li | H04M 15/8033 |
| 2022/0345887 A1* | 10/2022 | Karampatsis | H04W 12/069 |

FOREIGN PATENT DOCUMENTS

| | | |
|---|---|---|
| WO | 2021045859 A1 | 3/2021 |
| WO | 2021069067 A1 | 4/2021 |

OTHER PUBLICATIONS

Yi Li et al., "Research on Wireless Resource Management and Scheduling for 5G Network Slice", 2021 International Wireless Communications and Mobile Computing (IWCMC), Jun. 28-Jul. 2, 2021, IEEE, 6 pages.

3GPP, "3rd Generation Partnership Project; Technical Specification Group Services and System Aspects; Procedures for the 5G System (5GS); Stage 2 (Release 17)", 3GPP TS 23.502 V17.1.0, Jun. 2021, 692 pages.

TecTec, "4.3.6 Application Function influence on traffic routing", 10 pages, retrieved from Internet Aug. 26, 2021; https://itectec.com/spec/4-3-6-application-function-influence-on-traffic-routing/.

3GPP, "3rd Generation Partnership Project; Technical Specification Group Services and System Aspects; System architecture for the 5G System (5GS); Stage 2 (Release 17)", 3GPP TS 23.501 V17.1.1, Jun. 2021, 526 pages.

3GPP, "3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) protocol aspects; Stage 3 (Release 17)", 3GPP TS 24.519 V17.1.0, Jun. 2021, 6 pages.

3GPP, "3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) protocol aspects; Stage 3 (Release 16)", 3GPP TS 24.519 V16.3.0, Dec. 2020, 73 pages.

3GPP, "3rd Generation Partnership Project; Technical Specification Group Services and System Aspects; System architecture for the 5G System (5GS); Stage 2 (Release 17)", 3GPP TS 23.501 V17.2.0 Sep. 2021, 542 pages.

3GPP, "3rd Generation Partnership Project; Technical Specification Group Core Network and Terminals; 5G System; Policy and Charging Control signalling flows and QoS parameter mapping; Stage 3 (Release 17)", 3GPP TS 29.513 V17.4.0 Sep. 2021, 170 pages.

3GPP, "3rd Generation Partnership Project; Technical Specification Group Services and System Aspects; Policy and charging control framework for the 5G System (5GS); Stage 2 (Release 17)", 3GPP TS 23.503 V17.1.0 Jun. 2021, 137 pages.

3GPP, "3rd Generation Partnership Project; Technical Specification Group Services and System Aspects; Policy and charging control architecture (Release 17)", 3GPP TS 23.203 V17.1.0 Jun. 2021, 267 pages.

3GPP, "3rd Generation Partnership Project; Technical Specification Group Services and System Aspects; Policy and charging control framework for the 5G System (5GS); Stage 2 (Release 17)", 3GPP TS 23.503 V17.2.0 Sep. 2021, 141 pages.

3GPP, "3rd Generation Partnership Project; Technical Specification Group Services and System Aspects; Procedures for the 5G System (5GS); Stage 2 (Release 17)", 3GPP TS 23.502 V17.2.1, Sep. 2021, 712 pages.

* cited by examiner

URSP Rules examples

| | |
|---|---|
| Rule Precedence=1<br>Traffic Descriptor:<br>Application<br>Identifiers=App1    }182a | Route Selection Descriptor Precedence=1<br>Network Slice Selection: S-NSSAI-a<br>DNN Selection: internet<br>Access Type preference: 3GPP access<br>URSP tag = IoT-1-UPF, IoT-QoS-1<br>          184a    185a    186a<br>                   NF_TOKEN  QOS_TOKEN  }183a |
| Rule Precedence=1<br>Traffic Descriptor:<br>Application<br>Identifiers=App2    }182b | Route Selection Descriptor Precedence=1<br>Network Slice Selection: S-NSSAI-x<br>DNN Selection: internet<br>Access Type preference: non-3GPP access<br>URSP tag = IoT-SMF-1-UPF-1, IoT-QoS-2<br>          184b    185b    186b<br>                   NF_TOKEN  QOS_TOKEN  }183b |
| Rule Precedence=1<br>Traffic Descriptor:<br>Application<br>Identifiers=App3    }182c | Route Selection Descriptor Precedence=1<br>Network Slice Selection: S-NSSAI-x<br>DNN Selection: internet<br>Access Type preference: non-3GPP access<br>URSP tag = IoT-Slice-N, IoT-QoS-3<br>          184c    185c    186c<br>                   NF_TOKEN  QOS_TOKEN  }183c |

FACILITATING USER EQUIPMENT TO USER EQUIPMENT COMMUNICATIONS IN A MOBILE NETWORK ENVIRONMENT

TECHNICAL FIELD

The present disclosure relates to network equipment and services.

BACKGROUND

Networking architectures have grown increasingly complex in communications environments, particularly mobile networking environments. In particular, network slicing is a networking concept that has been introduced for Third Generation Partnership Project (3GPP) mobile networks, such as 3GPP Fifth Generation (5G) mobile networks. With the introducing of network slicing architectures, there are significant challenges in managing network communications and connectivity for mobile network devices.

BRIEF DESCRIPTION OF THE DRAWINGS

FIG. 1B is a diagram illustrating various user equipment (UE) Route Selection Policy (URSP) rule examples according to various example embodiments.

DESCRIPTION OF EXAMPLE EMBODIMENTS

Overview

Figure 1A:
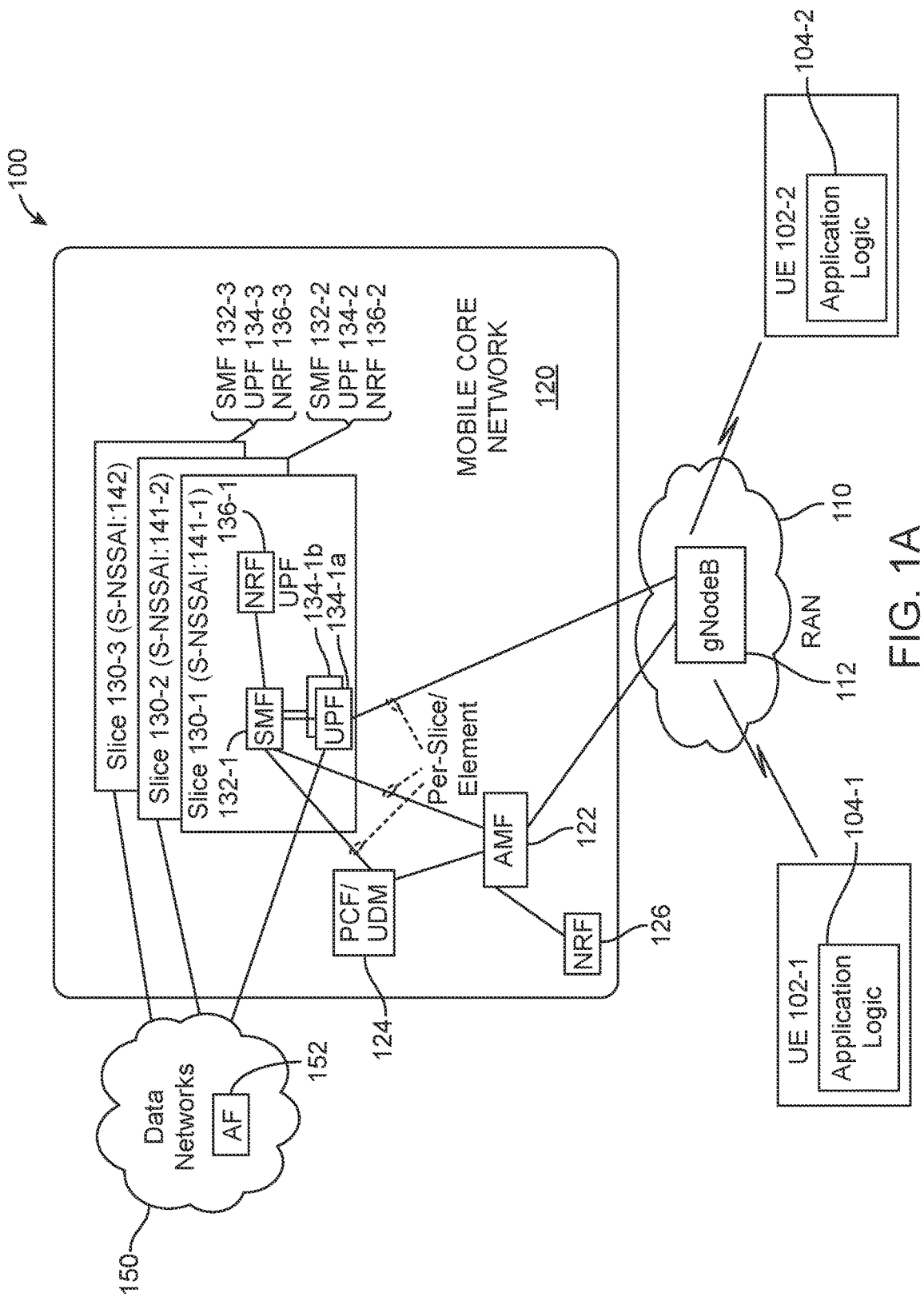
FIG. 1A is a block diagram of a system in which techniques may be implemented to facilitate user equipment (UE) to UE communications in a mobile network environment, according to an example embodiment.

Presented herein are techniques to facilitate user equipment (UE) to UE communications in a mobile network environment, for example, for UEs that belong to and/or may be involved in time sensitive network (TSN) communications. For TSN communications between devices/UEs, it is important to anchor Protocol Data Unit (PDU) sessions on same slice and network function instances in a Third Generation Partnership Project (3GPP) Fifth Generation (5G) network. To facilitate selection/assignment of the same network function and slice instances as well as appropriate Quality of Service (QoS) values for PDU sessions involving devices seeking to establish TSN communications, it would be advantageous for the devices to provide an indication to the network that TSN communications are desired.

UE Route Selection Policy (URSP) rules utilize well-defined 3GPP procedures for defining and configuring UE/device policies. Accordingly, techniques herein provide for extending URSP rules to define new tokens that can be used between UEs and the 5G core (5GC) network to facilitate UE to UE TSN communications. In one embodiment, a method is provided that may include provisioning a user equipment (UE) route selection policy (URSP) for each of a first UE and a second UE, wherein each URSP provisioned for each of the first UE and the second UE comprises: a first token that identifies at least one network resource that is to be utilized for a session for each of the first UE and the second UE; and a second token associated with a quality of service (QoS) that is to be provided for the session for each of the first UE and the second UE. Upon obtaining the first token and the second token from the first UE by a mobile network, the method may include establishing a first session for the first UE utilizing the at least one network resource identified by the first token, wherein the first session for the first UE is provided a QoS level based on the second token; and upon obtaining the first token and the second token from the second UE by the mobile network, establishing a second session for the second UE utilizing the at least one network resource that was utilized for the first session for the first UE, wherein the second session for the second UE is provided the QoS level based on the second token.

Example Embodiments

Presented herein are various techniques that may facilitate providing slice attribute information to a user equipment (UE) in a mobile network environment. Network slicing is a key concept in the Third Generation Partnership Project (3GPP) Fifth Generation (5G) System (5GS) architecture. A network slice is a logical end-to-end network that can be dynamically created. Generally, a network slice also referred to generally as a 'slice' or can refer to a group or set of Virtualized Network Functions (VNFs) that are configured to facilitate a certain mobile network service or group of mobile network services.

A given UE may have access to multiple slices over the same Radio Access Network (RAN). Each slice may serve a particular service type with an agreed upon Service-level Agreement (SLA). To provide mobile network services associated with a given slice type, a slice of the given slice type can be instantiated in which the instantiated slice for the slice type can provide certain mobile network services to a number of UEs.

A network slice instance within a Public Land Mobile Network (PLMN) can include any combination of Next Generation (NG) RAN and/or core network control plane and user plane network functions.

Per-3GPP Technical Specification (TS) 23.501, Section 5.15.2, Single-Network Slice Selection Assistance Information (S-NSSAI) can be used to uniquely identify a slice in which an S-NSSAI includes a Slice/Service Type (SST), which indicates the expected slice behavior for a slice requested by a UE in terms of expected features and services, and a Slice Differentiator (SD), which is optional and can be used to differentiate among multiple slices of a same SST.

Different types of slices (slice types) can be configured for a mobile network such that each slice type can provide certain mobile network services. As referred to herein and in the claims, the terms 'slice' and 'slice instance' may be used interchangeably to refer to a slice type that is instantiated (e.g., configured, created, operated, etc.) within a mobile core network to provide one or more mobile network services for one or more user equipment. Various VNFs that can be configured for a slice type in accordance with techniques described herein can include Third Generation Partnership Project (3GPP) Fourth Generation/Long Term Evolution (4G/LTE) VNFs and/or Fifth Generation (5G) VNFs, as may be prescribed, at least in part, by 3GPP standards.

Various example slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

For various examples herein, a slice type requested by a UE can be referenced generally as a number or value, however, it is to be understood that a slice requested by the UE can correspond to an SST value and, optionally, an SD, in accordance with 3GPP specifications. It is to be understood that additional SST values may be configured by a mobile network operator for other slice types. Additionally, slice type values used for various examples/embodiments described herein may differ from the standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

The concept of a time sensitive network (TSN) was studied by 3GPP in Release 16. In the TSN architecture, the 5GS is modeled as a TSN bridge. A primary use case of TSN is Industrial IoT (IIoT). In 3GPP Release 17, IIoT is being studied. One issue with Release 17 studies involves UE to UE (UE-UE) time sensitive communication (TSC) use cases in which solutions are being studied that may provide 5GS awareness regarding TSN types of communications that may be utilized by UEs in order to ensure that deterministic Quality of Service (QoS) flows are served to UEs involved in such communications. The conventional 3GPP standards-based solution to facilitate a first UE directly communicating with a second UE typically involves a lot of signaling and processing by the 5GS to ensure that a same user plane function (UPF) is selected for both UEs to provide a TSN bridge for UE-UE communications.

As noted, one issue being studied in 3GPP Release 17 involves how the 5GS is to be made aware of UE/Device-Side TSN Translator (DS-TT) pairs that can perform UE-UE communications. In current implementations, a slice selection policy and Data Network Name (DNN) alone may not ensure that that same UPF is selected for Protocol Data Unit (PDU) connections for a pair of UEs that can communicate with each other. Rather, an additional state is maintained in an Access and Mobility Management Function (AMF) and a Session Management Function (SMF) indicating that a UE has an ongoing TSN communication with other UE(s). Further, if both UEs are connected to a different access network, gNodeB, or AMF, then additional states may be involved for a Unified Data Repository (UDR). Such issues are currently gaps in 3GPP standards, which are being studied for Release 17.

Another issue, as noted above, that is being discussed for IIoT/TSC involves the configuration of deterministic QoS for QoS flows of at least two UEs served by the same UPF. Currently, providing deterministic QoS involves interactions with a Policy Control Function (PCF) to ensure that QoS flows of PDU sessions for a pair of UEs are provided the same QoS and there can be issues related to configuration mismatch or other network related factors (e.g., network load conditions, QoS authorization, etc.) that may result in a different QoS being applied for QoS flows for both UEs. Thus, this is another gap in 3GPP standards that is being studied for Release 17.

In order to address the issues discussed above, techniques are described herein that can be utilized within a mobile core network environment that provides a solution to ensure that PDU sessions from two UEs engaged in direct time sensitive communications will be served by the same set of network resources, such as the same set of Network Functions (NFs) (e.g., SMF, UPF, etc.) or the same slice instance for a given slice type, and will receive the same QoS. The solution provided herein can be utilized to provide atomicity for both NF selection and ensuring the same QoS level for QoS flows used by two UEs involved in TSC types of communications.

Referring to FIG. 1A, FIG. 1A is a block diagram of a system 100 in which techniques may be implemented to facilitate UE to UE communications in a mobile network environment, according to an example embodiment. As shown in FIG. 1A, system 100 may include a UE 102-1, a UE 102-2, a Radio Access Network (RAN) 110, a mobile core network 120, and one or more data networks 150.

UE 102-1 may be configured with application logic 104-1 and UE 102-2 may be configured with application logic 104-1. RAN 110 may be implemented as a 3GPP 5G/next generation (nG) RAN and may include at least one gNodeB 112 (sometimes referred to as a 'gNB').

In at least one embodiment, mobile core network 120 may be representative of a 5G core (5GC) network or 5GS and may include an Access and Mobility Management Function (AMF) 122, a Policy Control Function (PCF) and Unified Data Management (UDM) entity 124, and a Network Repository Function (NRF) 126. PCF/UDM 124 may interface with or include a Unified Data Repository (UDR), not shown in FIG. 1A. PCF/UDM 124 are illustrated as a combined element in FIG. 1A, however, it is to be understood that a PCF and a UDM may be implemented as separate network elements. Mobile core network 120 may also include a number of slice instances that have been instantiated for corresponding slice types provided by mobile core network 120 for various services (e.g., general services, TSN services, mIoT services, URLLC services, etc.) that may be provided mobile core network 120 for one or more PDU sessions for UE 102-1 and UE 102-2.

For example, mobile core network 120 may include a slice instance 130-1, a slice instance 130-2, and a slice instance 130-3 in which each slice may be configured to provide services for each of a corresponding slice type and may be identified by corresponding S-NSSAI. Each slice may include a corresponding Session Management Function (SMF), a corresponding User Plane Function (UPF), and a corresponding NRF.

For example, slice instance 130-1 may include an SMF 132-1, a UPF 134-1a, a UPF 134-1b, and an NRF 136-1 and may be identified by an S-NSSAI '141-1' (e.g., SST-SD: '141-1') and slice instance 130-2 may include an SMF 132-2, a UPF 134-2, and an NRF 136-2 and may be identified by the S-NSSAI '141-2' (e.g., SST-SD: '141-2'). Thus, both of slice instances 130-1 and 130-2 may be instantiated slice instances of a same slice type (S-NSSAI-141) that can be provided by mobile core network 120, and may have different Slice Differentiator (SD) values to distinguish the different slice instances of the same slice type. Also shown in FIG. 1A, slice instance 130-3 may represent an instantiated slice instance for another slice type (different than the slice type of slice instances 130-1 and 130-2) that may include an SMF 132-3, a UPF 134-3, and an NRF 136-3 and may be identified by an S-NSSAI '142'. The SMFs, UPFs, and NRFs for each of slice instances 130-2 and 130-3 are labeled but not shown in FIG. 1A for purposes of brevity only in order to illustrate/discuss other features of system 100.

The VNFs (e.g., SMF 132-1, 132-2, and 132-3, UPF 134-1a, 134-1b, 134-2, and 134-3, and NRF 136-1, 136-2, and 136-3) for the slice instances of mobile core network 120 are shown for illustrative purposes only and are not meant to limit the broad scope of the present disclosure. It is to be understood that any VNFs may be provided for network slice instances as may be prescribed by 3GPP standards, GSMA standards, etc. various mobile network services that may be provided by various slice types. Further, in some instances multiple SMFs and/or UPFs may be provided for one or more of slice instances 130-1, 130-2, and/or 130-3 (e.g., slice instance 130-1 may include multiple SMFs in addition to multiple UPFs 134-1a and 134-1b).

Further, it is to be understood that other VNFs/network elements may be configured for mobile core network 120 for any combination of Third Generation (3G)/Fourth Generation (4G)/5G/nG implementations, such as any combination of a Policy and Charging Rules Function (PCRF), a PCF, a Network Slice Selection Function (NSSF), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications. Although PCF/UDM 122 is shown within mobile core network 120, it is to be understood that one or more of slice instances 130-1, 130-2, and/or 130-3 can also include corresponding PCFs/UDMs.

In various embodiments, the data networks 150 of FIG. 1A may include be any combination of the Internet, a gaming network, an Internet Protocol (IP) Multimedia Subsystem (IMS), an Ethernet data network (not shown), Ethernet switching system(s) (not shown), and/or the like. In one embodiment, data networks 150 may include at least one application function (AF) 152.

As illustrated in FIG. 1A, UE 102-1 includes application logic 104-1 and UE 102-2 includes application logic 104-2 in which application logic 104-1 and application logic 104-2 may each represent one or more applications operating on UE 102-1 and 102-2, such as audio/video streaming applications, collaboration applications, enterprise applications, social networking applications, combinations thereof, and/or the like. In some instances, application logic for a given UE may perform communication with AF 152 via mobile core network 120.

RAN 110, via gNodeB 112, may interface with mobile core network 120 via one or more wired and/or wireless interfaces. For example, gNodeB 112 may interface with AMF 122. The gNodeB 112 may also interface with each of UPF 134-1a and 134-1b of slice instance 130-1, UPF 134-2 of slice instance 130-2, and UPF 134-3 of slice instance 130-3. RAN 110, via gNodeB 112, may also interface with UE 102-1 and UE 102-2 via one or more over-the-air Radio Frequency (RF) connections.

Regarding mobile core network 120, AMF 122 may further interface with PCF/UDM 124 and NRF 126. AMF 122 may also interface with each of SMF 132-1 of slice instance 130-1, SMF 132-2 of slice instance 130-2, and SMF 132-3 of slice instance 130-3. PCF/UDM 124 may also interface with each of SMF 132-1 of slice instance 130-1, SMF 132-2 of slice instance 130-2, and SMF 132-3 of slice instance 130-3. SMF 132-1 and UPF 134-1a and 134-1b of slice instance 130-1 may further interface with each other, and SMF 132-1 may also interface with NRF 136-1. Although not shown in FIG. 1A, SMF 132-2 and UPF 134-2 of slice instance 130-2 may further interface with each other, and SMF 132-2 may also interface with NRF 136-2 in a manner similar to that as shown for slice instance 130-1. Additionally, SMF 132-3 and UPF 134-3 of slice instance 130-3 may further interface with each other, and SMF 132-3 may also interface with NRF 136-3 in a similar manner. Additionally, UPF 134-1a and 134-1b of slice instance 130-1 may further interface with data networks 150, UPF 134-2 of slice instance 130-2 may also interface with data networks 150, and UPF 134-3 of slice instance 130-3 may also interface with data networks 150.

The various interfaces shown in FIG. 1A are provided for illustrative purposes only and are not meant to limit the broad scope of the present disclosure. It is to be understood that network connectivity/interfaces among any of UE 102, RAN 110, mobile core network 120 and data networks 150, and any elements/logic associated therewith, may be provided in any manner/configuration in accordance with 3GPP standards to facilitate operations as discussed for embodiments herein.

Generally, RAN 110 may include any combination of one or more 3GPP 5G/nG gNodeB or gNB, such as gNodeB 112 and/or 3GPP 4G/LTE evolved node Bs (eNodeBs or eNBs), not shown, to facilitate network connectivity between UE 102 and mobile core network 120. A gNodeB/eNodeB, such as gNodeB 112, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for RAN 110 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more UE, such as UE 102-1 and/or UE 102-2, may utilize to connect to RAN 110 for one or more sessions (e.g., voice, video, data, gaming, combinations thereof, etc.) with a mobile core network, such as mobile core network 120.

A UE, such as UE 102-1 and UE 102-2, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. Thus, a UE may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a RAN, such as RAN 110, for one or more sessions with a mobile core network, such as mobile core network 120.

In addition to various operations discussed for techniques herein, an AMF, such as of AMF 122, may facilitate access and mobility management control/services for one or more UE, such as UE 102-1 and UE 102-2, for connection of UE 102-1 and UE 102-2 with mobile core network 120. In addition to various operations discussed for techniques herein, an SMF, such as SMF 132-1 for slice instance 130-1 (and any other SMFs discussed herein) may be responsible for UE PDU session management (SM), with individual functions/services being supported on a per-session basis in order to facilitate data transfer(s) between a UE and one or more data networks 150 via one or more UPFs. Generally, a UPF, such as UPF 134-1*a* and UPF 134-1*b* of slice instance 130-1 (and any other UPFs discussed herein) may operate to provide packet routing and forwarding operations for user data traffic and may also perform a variety of functions such as packet inspection, traffic optimization, QoS, policy enforcement and user data traffic handling (e.g., to/from one or more data networks 150), and billing operations (e.g., accounting, etc.) for UE 102-1 and UE 102-2 sessions.

Typically, a PCF, such as the PCF of PCF/UDM 124 stores policy data for the system 100 to provide policy control services (e.g., to facilitate access control for UE 102-1 and UE 102, network selection, etc.). Typically, a UDM, such as the UDM of PCF/UDM 124 stores subscription data for subscribers (e.g., UE 102-1 and UE 102-2) that can be retrieved and/or otherwise obtained/utilized during operation of system 100. Typically, an NRF, such as any of NRF 126, NRF 136-1, 136-2, and 136-3, provides support for NF management (e.g., registering, deregistering, updating services to NFs/NF services), NF discovery (e.g., enabling NF service consumer(s) to discover a set of NF instances with a specific NF service, type, property (e.g., Fully Qualified Domain Name (FQDN) and/or other property), etc. and/or to discover a specific NF service), and NF access (e.g., NF authorization) at a core network level (e.g., for NRF 126) or at a per-slice level (e.g., for slice instance 130-1 including NRF 136-1, etc.).

Generally, NF instance information stored/maintained for a given NF instance (e.g., an SMF, a UPF, etc.) within a given NRF can include a FQDN for the NF instance, properties and/or other information identified for the NF instance, and/or the like, which may be used to identify/select the NF instance for handling/serving a particular UE session. NF instance information may be shared among any of NRF 126, NRF 136-1, 136-2, and 136-3 to facilitate identification/selection (NF discovery) of NF instances in accordance with techniques discussed herein.

Embodiments herein provide for the ability to facilitate UE to UE communications between UE 102-1 and UE 102-2 via system 100. In particular, UE Route Selection Policy (URSP) rules can be configured for each of UE 102-1 and UE 102-2 in which each URSP rule can be enhanced with a network function (NF) token ('NF_TOKEN', as referred to herein) and a QoS token ('QOS_TOKEN', as referred to herein) in which the NF_TOKEN may be a 'tag', identifier, or the like that can be used to ensure that PDU sessions for all UEs that are part of/belong to a TSN and/or that may be involved in UE to UE TSN communications can be established on the same network resources (e.g., same slice/NF instance(s)) and the QOS_TOKEN can a tag, identifier or the like that be used to ensure that the same QoS level is provided for all the PDU sessions for the UEs.

3GPP Technical Specification (TS) 23.503 defines standards-based Access Network Discovery and Selection Function (ANDSF) and URSP rules, which can be sent to all UEs, devices, etc. connecting to a 5GC/5GS. During operation of a mobile core network, various USRP rules or policies can be pushed to a UE from the PCF in order to help the UE to determine an appropriate route for PDU session(s) initiated by the UE, based on various information, such as an application identifier (ID), Data Network Name (DNN), location, etc.

Techniques provided herein seek to leverage the concept of a URSP and extend the existing URSP structure to include tokens that help the mobile core network 120 (e.g., NFs in the mobile core network such as AMF 122 and/or an SMF for a given slice) to identify whether a TSN is to be utilized for a UE PDU session, and that assist the mobile core network 120 in network resource selection, such as slice/NF instance selection, as well as determining QoS for the UE PDU session.

In at least one embodiment, a NF token, referred to herein as 'NF_TOKEN' can be provisioned for all UEs that are to be a part of a given TSN by extending the URSP to include a same NF_TOKEN, such that the NF_TOKEN will be common/the same for all UEs belonging to the given TSN. Thus, conceptually, all UEs that belong to a same TSN can be provided the same NF_TOKEN in order to ensure that all the PDU sessions for the UEs belonging to the same TSN can be established on the same set of network resources, such as the same slice/NF instance(s) by the mobile core network 120. As multiple TSNs can be configured for different groups of UEs, different NF_TOKENs can be configured for the different groups of UEs for the different TSNs.

A QoS token, referred to herein as 'QOS_TOKEN' can also be provisioned for all UEs that are to be a part of a given TSN by extending the URSP to include a same QOS_TOKEN, such that the QOS_TOKEN will be common/the same for all UEs belonging to the given TSN. The QOS_TOKEN provided to all UEs of a given TSN can be used for QoS allocation by the mobile core network 120 to ensure that all the UEs receive the same QoS level for their corresponding PDU sessions for the given TSN. When UEs belonging to the same TSN request creation of PDU sessions, in addition to providing a given NF_TOKEN for the same TSN, the UEs can also provide a QOS_TOKEN, which may be analogous to a QoS 'tag'. For ensuring the same QoS level is provided to all UEs belonging to the same TSN, after a first UE, such as UE 102-1, has established a PDU session and its QoS flows are created (for a given QOS_TOKEN, as presented by the first UE within a PDU Session Establishment Request message), when a second UE, such as UE 102-2, seeks establishment of a PDU session for the same TSN, based on the same QOS_TOKEN being provided by the second UE (via the PDU Session Establishment request sent by the second UE), the mobile core network 120 and, in particular, a given SMF serving both UEs, can ensure that same QoS level is provided for second PDU session involving the second UE.

Thus, the NF_TOKEN may be a configurable parameter that can be used for NF selection across all slices/NFs for mobile core network 120 and the QOS_TOKEN may be used for QoS allocation for the PDU sessions belonging to the same TSN. Each NF_TOKEN and QOS_TOKEN can be provisioned for each UE on a per-application basis, such that a particular application (e.g., as identified by a corresponding application ID) can be configured/mapped to a corresponding NF_TOKEN and QOS_TOKEN. For example, in one instance, a common NF_TOKEN provided to both UE 102-1 and UE 102-2 for a given application can be used to ensure that the same UPF is selected for PDU sessions for the UEs for a given TSN. NF_TOKENs and QOS TOKENs discussed for various embodiments herein can also be referred to interchangeably as URSP 'tags'.

It should be noted that a particular NF_TOKEN can be used either to identify a network resource, such as a particular slice or NF instance to be selected (e.g., by selecting a NF having an FQDN, as stored in a given NRF for a particular slice, including a particular string as identified by a given token), or can be used by the mobile core network 120 in order to select a same slice/NF instance for UEs that include a same NF_TOKEN within a PDU session establishment request. Regarding FQDNs, a full or partial FQDN could be configured in order to facilitate such identification depending on operator configuration. For example, for a given NF token identifying the string 'IoT-1-UPF' could be a full match to a UPF FQDN identified as such (in case an operator has configured an FQDN as such) or a partial match to an FQDN, such as 'Operator-IoT-1-UPF'. As the NF_TOKEN can be mapped to a given NF instance, configuring the token to be a string format allows the mapping of an NF_TOKEN to a particular NF instance to be dynamically changed, if needed. For example, an NF_TOKEN can be dynamically changed from pointing to an NF instance 'A' to an NF instance 'B' by changing the Domain Name System (DNS) configuration for NF instance B, which would get propagated to the NRF, for example, if NF instance 'A' is under maintenance. Thus, NF_TOKENs, as discussed in further detail below with reference to FIG. 1B, can provide different levels of atomicity for slice/NF instance selection.

Further, it should be noted that a particular QOS_TOKEN is not used to identify a particular QoS level, but rather a given QOS_TOKEN can act as a QoS tag that can be configured to be mapped to a given QoS level within the mobile core network 120. Thus, a particular QoS level, such as a particular 5G QoS Identifier (5QI) value for 5G/nG or QoS Class Identifier for 4G/LTE, can be mapped to a given QOS_TOKEN that can be maintained by/within the mobile core network 120 (e.g., via PCF/UDM 124). Accordingly, a given QOS_TOKEN to QoS value mapping can be changed within the network (e.g., to provide a different QoS level for a given application/TSN), without needing to update the QOS_TOKEN provisioned for UEs belonging to the same TSN.

FIG. 1B includes a Table 180 illustrating various extended URSP rule examples including various NF_TOKEN and QOS_TOKEN example details that illustrate how different URSP tags, such as NF_TOKENs can be used to facilitate selection of a given slice instance/NF instances and how different QOS TOKENS can be used to indicate QoS values to be used for UE PDU sessions. Three example URSP rules 181a, 181b, and 181c are illustrated in FIG. 1B. Generally, a URSP rule includes a Traffic Descriptor portion and a Route Descriptor portion in which the Traffic Descriptor portion includes (among other information) an Application Identifier field that identifies a particular application and the Route Descriptor portion includes one or more route descriptor fields that are utilized for a PDU session associate with the particular application. In accordance with embodiments herein, the Route Descriptor portion of URSP rules can be enhanced or extended to include a URSP tag field in which a NF_TOKEN and a QOS_TOKEN can be provisioned for different applications and can be utilized for ensuring that different PDU sessions for different UEs belonging to a given TSN can be established on the same slice/NF instances (e.g., via a given NF_TOKEN) and that the PDU sessions can be provided the same QoS level (e.g., 5QI/QCI).

In one example, consider that example URSP rule 181a includes: a Traffic Descriptor portion 182a that includes a Rule Precedence field identifying the rule precedence of 1 (e.g., the highest precedence value), and an Application Identifier field identifying an application 'App1'. Further, consider that example URSP rule 181a includes a Route Descriptor portion 183a that includes: a Route Selection Descriptor Precedence field identifying the route descriptor rule precedence of 1; a Network Slice Selection field identifying a particular slice type that is to be utilized for the PDU session for the application (e.g., 'S-NSSAI-a' for a slice type 'a'); a DNN Selection field indicating the DNN of 'internet'; an Access Type Preference field indicating a preference for a 3GPP access (e.g., 3GPP 5G, nG, etc., as opposed to Wi-Fi, for example). Further, consider that Route Descriptor portion 183a is enhanced to include a URSP tag field 184a that identifies an NF_TOKEN 185a identifying 'IoT-1-UPF' and a QOS_TOKEN 186a identifying 'IoT-QoS-1'.

Thus, example URSP rule 181a can be used to associate the traffic of application 'App1' with slice type 'S-NSSAI-a', 3GPP access, and the 'internet' DNN in order to enforce a routing policy for application 'App1' in which the traffic of 'App1' is to be transferred via a PDU session supporting S-NSSAI-a and DNN=internet over a 3GPP access. Further, the NF_TOKEN 185a, 'IoT-1-UPF', can be used to provide a hint to the mobile core network 120 and, in particular, to an SMF of a given slice instance for slice S-NSSAI-a, that the SMF is to select a UPF for the UE PDU session for 'App1' that includes an FQDN of 'IoT-1-UPF' for UEs communicating the NF_TOKEN 185a, 'IoT-1-UPF' to the mobile core network 120 via a PDU Session Establishment request for App1. Additionally, the QOS_TOKEN 186a of 'IoT-QoS-1' can be used to indicate that the SMF is to ensure that a QoS level that is mapped to the QOS_TOKEN 186a corresponding to 'IoT-QoS-1' is provided for the PDU session. For example, 'IoT-QoS-1' may be mapped to a 5QI of 80 (e.g., for low latency eMBB applications) in which the mapping may be stored in PCF/UDM 124 (e.g., the mapping may indicate IoT-QoS-1=5QI(80)). A QOS_TOKEN could be mapped to or correlated with any other QoS policies, such as Allocation and Retention Priority (ARP) level, and/or any other QoS policies as may be defined according to 3GPP and/or other standards.

In another example, consider that example URSP rule 181b includes: a Traffic Descriptor portion 182b that includes a Rule Precedence field identifying the rule precedence of 1, and an Application Identifier field identifying an application 'App2'. Further, consider that example URSP rule 181b includes a Route Descriptor portion 183b that includes: a Route Selection Descriptor Precedence field identifying the route descriptor rule precedence of 1; a Network Slice Selection field identifying a particular slice type that is to be utilized for the PDU session for the application (e.g., 'S-NSSAI-x' for a slice type 'x'); a DNN Selection field indicating the DNN of 'internet', an Access Type Preference field indicating a preference for a non-3GPP access (e.g., Wi-Fi, as opposed to 5G, for example). Further, consider that Route Descriptor portion 183*b* is enhanced to include a URSP tag field 184*b* that identifies an NF_TOKEN 185*b* identifying IoT-SMF-1-UPF-1' and a QOS_TOKEN 186*b* identifying 'IoT-QoS-2'.

Thus, example URSP rule 181*b* can be used to associate the traffic of application 'App2' with slice type 'S-NSSAI-x', a non-3GPP access, and the 'internet' DNN in order to enforce a routing policy for application 'App2' in which the traffic of 'App2' is to be transferred via a PDU session supporting S-NSSAI-x and DNN=internet over a non-3GPP access. Further, the NF_TOKEN 185*b*, 'IoT-SMF-1-UPF-1', can be used to provide a hint to the mobile core network 120 and, in particular, to AMF 122, to select a same SMF (SMF-1) and the selected SMF is to select a same UPF (UPF-1) for UEs communicating the NF_TOKEN 185*b*, IoT-SMF-1-UPF-1' to the mobile core network 120 via a PDU Session Establishment request for App2. Additionally, the QOS_TOKEN 186*b* of 'IoT-QoS-2' can be used to indicate that the SMF is to ensure that a QoS level that is mapped to the QOS_TOKEN 186*b* corresponding to 'IoT-QoS-2' is provided for the PDU session.

In another example, consider that example URSP rule 181*c* includes: a Traffic Descriptor portion 182*c* that includes a Rule Precedence field identifying the rule precedence of 1, and an Application Identifier field identifying an application 'App3'. Further, consider that example URSP rule 181*c* includes a Route Descriptor portion 183*c* that includes: a Route Selection Descriptor Precedence field identifying the route descriptor rule precedence of 1; a Network Slice Selection field identifying a particular slice type that is to be utilized for the PDU session for the application (e.g., 'S-NSSAI-x' for a slice type 'x'); a DNN Selection field indicating the DNN of 'internet'; an Access Type Preference field indicating a preference for a non-3GPP access (e.g., Wi-Fi, as opposed to 5G, for example). Further, consider that Route Descriptor portion 183*c* is enhanced to include a URSP tag field 184*c* that identifies an NF_TOKEN 185*c* identifying 'IoT-Slice-N' and a QOS_TOKEN 186*c* identifying 'IoT-QoS-3'.

Thus, example URSP rule 181*c* can be used to associate the traffic of application 'App3' with slice type 'S-NSSAI-x', a non-3GPP access, and the 'internet' DNN in order to enforce a routing policy for application 'App3' in which the traffic of 'App3' is to be transferred via a PDU session supporting S-NSSAI-x and DNN=internet over a non-3GPP access. Further, the NF_TOKEN 185*c*, 'IoT-Slice-N', can be used to provide a hint to the mobile core network 120 that all network functions (e.g., SMF, PCF, UPF, etc.) for a same IoT slice instance 'N' are to be selected for UEs communicating the NF_TOKEN 185*c*, 'IoT-Slice-N' to the mobile core network 120 via a PDU Session Establishment request for App3. Additionally, the QOS_TOKEN 186*c* of 'IoT-QoS-3' can be used to indicate that the SMF is to ensure that a QoS level that is mapped to the QOS_TOKEN 186*c* corresponding to 'IoT-QoS-3' is provided for the PDU session.

In various embodiments, NF_TOKENs and QOS TOKENs can be pre-configured in for UEs for various applications that may be included in TSNs (e.g., based on factory settings provided prior to network registration, etc.) and/or can be configured in subscription information (e.g., stored in PCF/UDM 124) which the mobile core network 120 can provide to a UE at the time of registration or, in some instances, can be provided to a UE if one or more tokens for one or more applications are removed, updated, or changed. In various embodiments, multiple URSP tags, including different NF_TOKENs and different QOS TOKENs can be defined in order to allow UEs to use different tags for different kinds and/or types of applications/sessions. In some instances, factory settings for a given UE can map NF_TOKEN(s) and QOS_TOKEN(s) to different application identifier(s) (app ID(s)), which could be used to augment or enhance URSP(s) received at a later time by the UE and/or could be overwritten by such tokens received in URSP(s) by the UE.

Thus, use of URSP tags, including an NF_TOKEN and a QOS_TOKEN can provide for the ability to bring different levels of atomicity for both network function selection and ensuring the same QoS flow for TSC/TSN types for communications between devices (e.g., IoT devices, IIoT devices, UEs, etc.).

Some other potential solutions may prescribe utilizing a dedicated TSN slice type for TSN users in order to facilitate UE to UE communications; however, currently there is no SST defined in 3GPP standards for a TSN slice type. Rather, SSTs are defined for eMBB, mIoT, URLLC, etc., but not for TSN communications. Moreover, having a dedicated slice of a TSN slice type may be costly and the TSN group of UEs will be attached to that slice. In contrast, techniques herein provide for tagging TSN traffic/PDU sessions (e.g., via PDU Session Establishment requests) and ensure that the sessions are connected to same slice and NFs, which can provide signaling and latency savings, such that the network function and QoS tokens can be provisioned in the PCF/UDM and provided to UEs as part of registration and/or, in some instances be configured per factory settings (prior to network registration) and, thus, can be dynamic in nature. For example, a dedicated TSN slice would keep the resources reserved and some of the time, e.g., when UEs are not communicating, network resources involving compute resources, memory resources, etc. may be underutilized. In contrast, techniques herein propose to use any slice that can offer the requested traffic. If many UEs are not communicating using the slice, then the same slice can be used for regular services, such as eMBB. Thus, the solution herein not require any dedicated slice to serve the request. If UEs are served by a different dedicated slice or slice instances then we extra signaling may be involved to ensure that same QoS values are used for the sessions. Additionally, the data traffic would likely travel through different slices (e.g., UPF-1 and UPF-2) which is an additional hop and would incur a latency cost. Additionally, different mobility cases involving a dedicated slice type may cause other complications.

Thus, techniques herein may not involve utilizing an additional slice type (e.g., a TSN slice type) but could, in some instances, be utilized with a TSN slice type if such a slice type was configured for a mobile core network. More specifically, the techniques described herein could be used ensure that PDU sessions for UEs presenting a same NF_TOKEN could be established on the same TSN slice instance and could be assigned the same QoS policies based the UEs presenting the same QOS_TOKEN. Further, techniques herein may also have the advantage of dynamically spreading traffic/sessions among multiple slices, depending on which tags (e.g., NF_TOKEN and QOS_TOKEN) may be attached to particular traffic/applications.

Consider various operational details for facilitating UE to UE communications in a network environment, with further reference to FIGS. 2A-2C, discussed below. For example, FIGS. 2A, 2B, and 2C are a message sequence diagram illustrating a call flow 200 associated with facilitating UE to UE communications in a mobile network environment, according to an example embodiment.

Figure 2A:
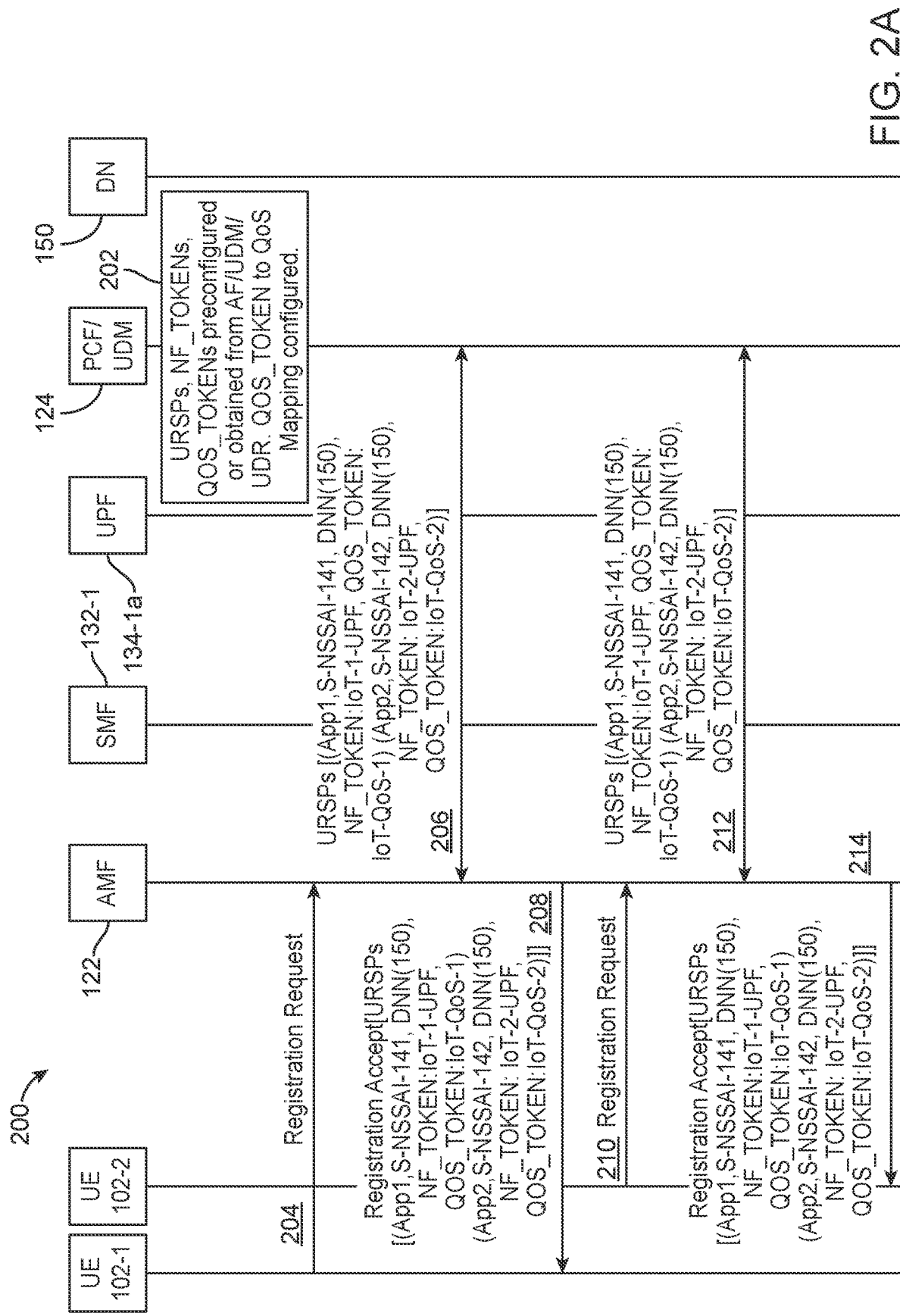
FIGS. 2A, 2B, and 2C are a message sequence diagram illustrating a call flow associated with facilitating UE to UE communications in a mobile network environment, according to an example embodiment.
Figure 2B:
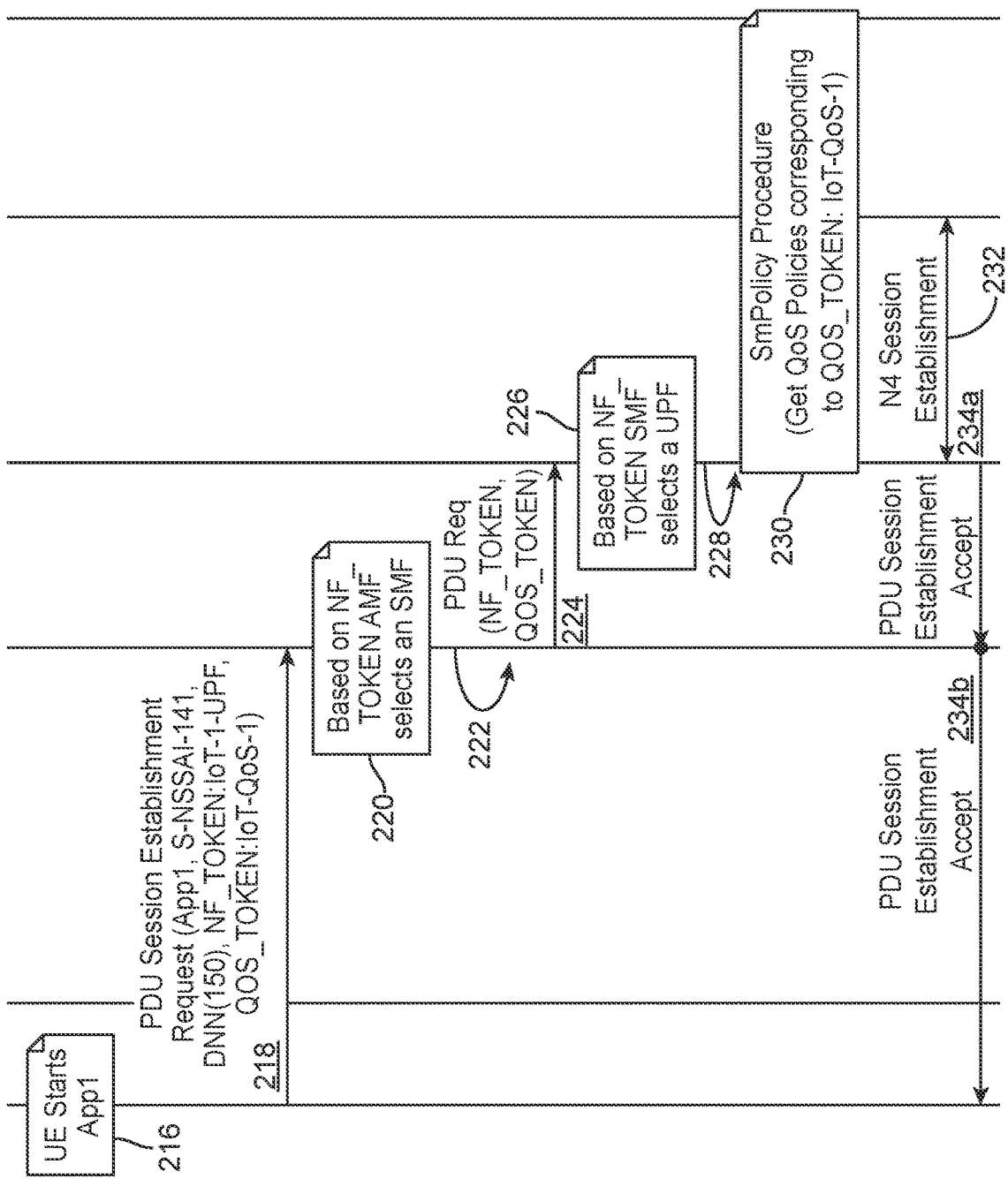
Figure 2C:
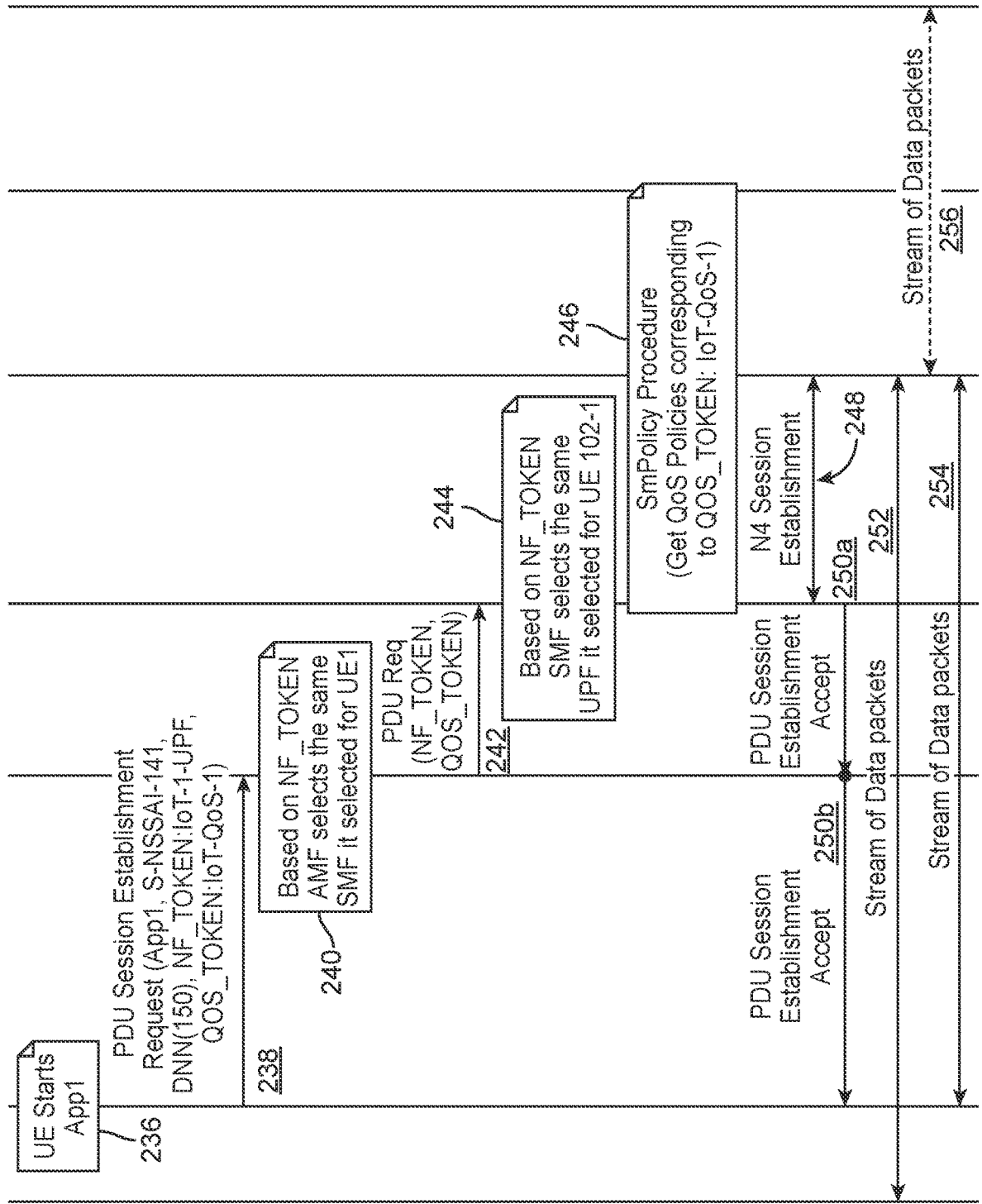

Consider for the example operational flows that FIGS. 2A-2C include UE 102-1, UE 102-2, AMF 122, SMF 132-1, UPF 134-1a, PCF/UDM 124, and data network (DN) 150. Although not shown in FIGS. 2A-2C, it is assumed that UE 102-1 and UE 102-2 interact/communicate with various network elements of mobile core network 120 via RAN 110/gNodeB 112, as shown in FIG. 1A.

For the example operational flows of FIGS. 2A-2C, consider that subscription information for UE 102-1 and UE 102-2 is preconfigured NF_TOKENs and QoS TOKENs in the mobile core network 120 for various applications, including a first application having an app ID, 'App1', and a second application having an app ID, 'App2', as shown at 202, in which the first application and the second application are assumed to be associated with TSN communications (e.g., based on an app ID for each application that is identified as being associated with TSN communications. Further consider at 202 that various URSPs for the UEs for App1 and App2 are configured in the mobile core network 120. It is to be understood that 'App1' and 'App2' can be different applications as discussed above for FIGS. 1A and 1B and, thus, can be configured with different URSP rules, NF_TOKENs and QoS TOKENs; the generic token identifiers/names/labels as discussed for various examples discussed herein are not meant to limit the broad scope of embodiments described herein.

Consider in one instance that a first URSP for 'App1' associated with a TSN is configured with URSP rules that include a Traffic Descriptor portion identifying 'App1' and a Route Descriptor portion that identifies (among other information, for example, as discussed above) a slice type corresponding to S-NSSAI-141, a DNN identifying DN 150, and URSP tags including an NF_TOKEN indicating 'IoT-1-UPF' (e.g., to indicate selection of a UPF having an FQDN including 'IoT-1-UPF', such as, for example, 'Operator-Location-IoT-1-UPF') and a QOS_TOKEN indicating 'IoT-QoS-1' (which can be mapped to a particular QoS level stored/maintained within PCF/UDM 124 and in some instances, other QoS policies configured for the application 'App''). Consider further that a second URSP for 'App2' associated with a TSN is configured with URSP rules that include a Traffic Descriptor portion identifying 'App2' and a Route Descriptor portion that identifies (among other information, for example, as discussed above) a slice type corresponding to S-NSSAI-142, a DNN identifying DN 150, and URSP tags including an NF_TOKEN indicating 'IoT-2-UPF' (e.g., to indicate selection of a UPF having an FQDN including 'IoT-2-UPF') and a QOS_TOKEN indicating 'IoT-QoS-2' (which can be mapped to another particular QoS level stored/maintained within PCF/UDM 124 and, in some instances, other QoS policies configured for the application 'App2').

Broadly for the embodiment of FIGS. 2A-2C, the URSPs and corresponding NF_TOKENs and QOS TOKENs can be provided to UEs 102-1 and 102-2 at the time of registration. Thereafter, when a given UE initiates a PDU session for an application (e.g., runs/executes an application via application logic) associated with a TSN type of communications, the UE can send the tokens corresponding to the application to the mobile core network along with other parameters (e.g., DNN, application identifier, UE/subscriber identifying information, such as International Mobile Subscriber Identity (IMSI), Subscription Permanent Identifier (SUPI), etc.). Depending on the level of atomicity configured for a given NF_TOKEN (e.g., identifying that a specific UPF is to be selected based on FQDN, identifying that the same NF(s) or slice are to be selected, etc.), the mobile core network 120 (e.g., 5GC) to select appropriate NF(s) for the PDU session and uses the QOS_TOKEN to assign an appropriate 5QI/QCI to the PDU session. Although the embodiment of FIGS. 2A-2C illustrates features in which the tokens are configured in mobile core network 120, it is to be understood that, in some embodiments, the tokens can be configured for UEs prior to network registration (e.g., as part of factory settings).

Continuing to 204, consider that UE 102-1 sends a Registration Request message to AMF 122, which includes the SUPI for UE 102-1. The Registration Request triggers AMF 122 to obtain (e.g., based on the SUPI for UE 102-1) the URSPs and their corresponding NF_TOKENs and QOS TOKENs as configured for subscription information for UE 102-1 via PCF/UDM 124, as shown at 206. In some instances, the operations at 206 may include the PCF fetching the URSPs from the UDM at the time of registration (or, in some instances, at the time of session creation and/or upon changing of URSP tag(s) for a given application). In some instances, if UE subscription information is configured for two different tags for the same application (e.g., if 'IoT-1-UPF'/'IoT-Qos-1' and 'IoT-2-UPF'/'IoT-QoS-2' are both configured for 'App1') then the PCF can determine, based on loading situations (e.g., based on NF/slice monitoring metrics obtained from a network data analytics function (NWDAF), which tags to provision for a given UE. In some instances, a network operator for mobile core network 120 may determine to change, update, and/or remove one or more URSP tag(s), upon which the PCF/UDM 124, via AMF 122, can send updates to UE(s) dynamically to reflect the changes, using procedures as defined, for example, in 3GPP TS 29.513.

At 208, a Registration Accept message is sent to UE 102-1 including the URSPs and their corresponding NF_TOKENs and QOS TOKENs. Further, consider at 210 that UE 102-2 sends a Registration Request message to AMF 122, which includes the SUPI for UE 102-2. The Registration Request triggers AMF 122 to obtain (e.g., based on the SUPI for UE 102-2) the URSPs and their corresponding NF_TOKENs and QOS TOKENs as configured for subscription information for UE 102-2 via PCF/UDM 124, as shown at 212. At 214, a Registration Accept message is sent to UE 102-2 including the URSPs and their corresponding NF_TOKENs and QOS TOKENs.

Continuing to FIG. 2B, consider at 216 the UE 102-1 starts (via application logic 104-1) the first application 'App1', which triggers the UE 102-1 to send a PDU Session Establishment Request message to AMF 122 at 218 that includes the application identifier for the first application 'App1', the S-NSSAI-141, the DNN identifying DN 150, the NF_TOKEN identifying 'IoT-1-UPF' and the QOS_TOKEN identifying 'IoT-QoS-1' included in the URSP rules for the first application 'App1'. Although not shown in FIG. 2B, the PDU Session Establishment Request can also include the SUPI for UE 102-1. At 220, consider that AMF 122 selects an SMF, such as SMF 132-1, for the PDU session based on the NF_TOKEN included in the PDU Session Establishment Request message. Although not shown in FIG. 2B, AMF 122 may query NRF 126 at 220 using the NF_TOKEN to identify SMF 132-1 such that NRF 126 may have information stored therein that indicates the UPF(s) served by SMF 132-1 (including a UPF having an FQDN including 'IoT-1-UPF') for S-NSSAI-141.

As shown at 222, the AMF 122 can determine if another UE had previously presented the NF_TOKEN 'IoT-1-UPF' and, if not, can store the SMF 132-1 selection for the corresponding NF_TOKEN to ensure that the same SMF 132-1 for slice instance 130-1 is selected for subsequent UEs that present the token. It is to be understood that the determination at 222 can be performed in parallel with or prior to the operations involving the selection at 220 (e.g., determining if another UE had previously presented the token/a prior selection based on the token had previously been performed before performing the selection at 220).

Continuing to 224, the AMF 122 sends the PDU Session Request to SMF 132-1 including the tokens. At 226, consider that SMF 132-1 selects UPF 134-1a to handle traffic for the UE PDU session for 'App1' based on the NF_TOKEN identifying 'IoT-1-UPF', which is included in the FQDN for UPF 134-1a. Although not shown in FIG. 2B, SMF 132-1 can query NRF 136-1 at 226 using the NF_TOKEN to identify/select UPF 134-1a such that NRF 136-1 may have information stored therein that indicates 'IoT-1-UPF' within an FQDN for UPF 134-1a. As shown at 228, the SMF 132-1 can determine if another UE had previously presented the NF_TOKEN 'IoT-1-UPF' and, if not, can store the UPF 134-1a selection for the corresponding NF_TOKEN to ensure that the same UPF 134-1a for slice instance 130-1 is selected for subsequent UEs that present the token. It is to be understood that the determination at 228 can be performed in parallel with or prior to the operations involving the selection at 226 (e.g., determining if another UE had previously presented the token/a prior selection based on the token had previously been performed before performing the selection at 226).

Continuing to 230, SMF 132-1 performs a Session Management (SM) policy procedure with PCF/UDM 124 in order to obtain the QoS policies corresponding to the QOS_TOKEN identifying 'IoT-QoS-1', based on the QOS_TOKEN mapping information configured for PCF/UDM 124. In one example, the SM policy procedure can include the SMF 132-1 sending PCF/UDM 124 an SM policy control message (e.g., Npcf_SMPolicyControl_Create request message) that includes the QOS_TOKEN 'IoT-QoS-1' in which the PCF/UDM 124 can respond with the QoS policies mapped to the QOS_TOKEN 'IoT-QoS-1'. As shown at 232, SMF 132-1 can initiate N4 session establishment with UPF 134-1a in which the SMF 132-1 provisions the QoS level as mapped to the QOS_TOKEN for the PDU session for UE 102-1 for the first application 'App1'. As shown at 234a and 234b, the SMF 132-1 sends a PDU Session Establishment Accept message to UE 102-1 via AMF 122.

Thereafter, consider at 236, as shown in FIG. 2C, that UE 102-2 starts (via application logic 104-2) the first application 'App1', which triggers the UE to send a PDU Session Establishment Request message to AMF 122 at 238 that includes the application identifier for the first application 'App1', the S-NSSAI-141, the DNN identifying DN 150, the NF_TOKEN identifying 'IoT-1-UPF' and the QOS_TOKEN identifying 'IoT-QoS-1' included in the URSP rules for the first application 'App1'. Although not shown in FIG. 2C, the PDU Session Establishment Request can also include the SUPI for UE 102-1. At 240, consider that, based on the NF_TOKEN identifying 'IoT-1-UPF' and a determination that AMF 122 had previously selected (and stored) an SMF selection for the corresponding NF_TOKEN identifying 'IoT-1-UPF', the AMF 122 selects the same SMF 132-1 for the PDU session for UE 102-2 for the first application 'App1'.

Continuing to 242, the AMF 122 sends the PDU Session Request to SMF 132-1 including the tokens. At 244, consider that, based on the NF_TOKEN identifying 'IoT-1-UPF' and a determination that SMF 132-1 had previously selected (and stored) a UPF selection for the corresponding NF_TOKEN identifying 'IoT-1-UPF', the SMF 132-1 selects the same UPF-1 for the PDU session for UE 102-2 for the first application 'App1'.

Continuing to 246, SMF 132-1 performs a SM policy procedure with PCF/UDM 124 in order to obtain the QoS policies corresponding to the QOS_TOKEN identifying 'IoT-QoS-1', based on the QOS_TOKEN mapping information configured for PCF/UDM 124. As shown at 248, SMF 132-1 can initiate N4 session establishment with UPF 134-1a in which the SMF 132-1 provisions the QoS level as mapped to the QOS_TOKEN for the PDU session for UE 102-2 for the first application 'App1'. As shown at 250a and 250b, the SMF 132-1 sends a PDU Session Establishment Accept message to UE 102-2 via AMF 122.

Thereafter, UE to UE communications can be exchanged between UE 102-1 and UE 102-2 via UPF 134-1a for the TSN to which both the UEs belong, as shown at 252 and 254. In some instances, the UEs can also exchange communications with the DN 150 via UPF 134-1, as shown at 256.

Accordingly, techniques herein facilitate UE to UE TSN communications through which the same instance of a given slice and NF(s) can be selected to serve such TSN communications.

Figure 3:
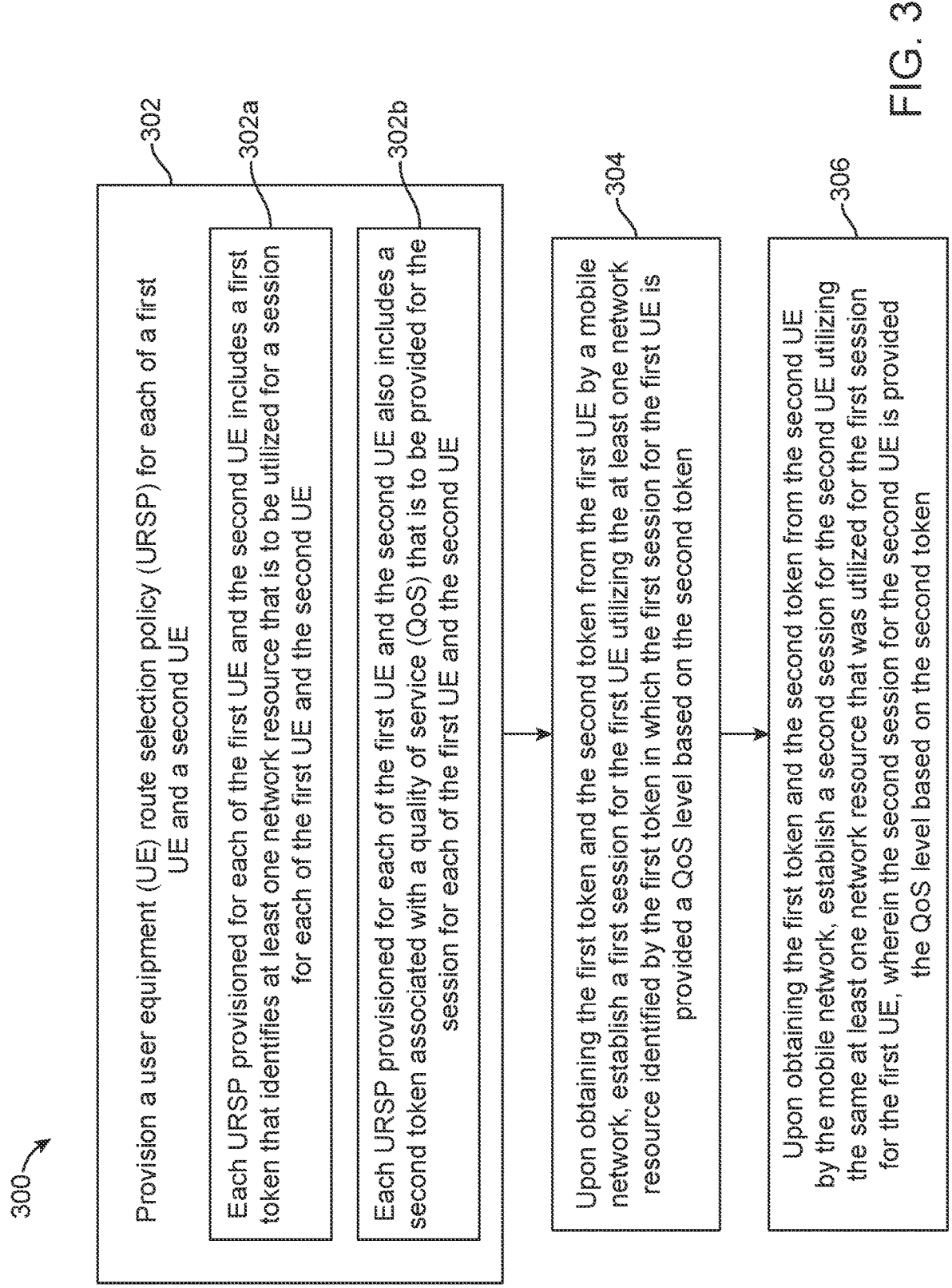
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed by a mobile core network or, more particular, by at least one network function of a mobile core network, such as AMF 122 and/or SMF 132-1 (or any other SMF) of mobile core network 120 in order to facilitate UE to UE communications, according to an example embodiment.

At 302, the method may include provisioning a user equipment (UE) route selection policy (URSP) for each of a first UE (e.g., UE 102-1) and a second UE (e.g., UE 102-2). As shown at 302a, each URSP provisioned for each of the first UE and the second UE includes a first token that identifies at least one network resource that is to be utilized for a session for each of the first UE and the second UE. As shown at 302b, each URSP provisioned for each of the first UE and the second UE also includes a second token associated with a quality of service (QoS) that is to be provided for the session for each of the first UE and the second UE.

At 304, the method may include, upon obtaining the first token and the second token from the first UE by a mobile network, establishing a first session for the first UE utilizing the at least one network resource identified by the first token, wherein the first session for the first UE is provided a QoS level based on the second token. In one instance, establishing the first session for the first UE further may further include upon obtaining the first token and the second token from the first UE by at least one network function (e.g., an AMF and/or an SMF) of the mobile network, selecting by the network function, a particular network resource to be utilized for the first session for the first UE (e.g., selecting an SMF by the AMF and/or selecting a UPF by the SMF, etc.).

At 306, the method may include, upon obtaining the first token and the second token from the second UE by the mobile network, establishing a second session for the second UE utilizing the same at least one network resource that was utilized for the first session for the first UE, wherein the second session for the second UE is provided the QoS level based on the second token. In at least one instance, establishing the second session for the second UE may further include, upon obtaining the first token and the second token from the second UE by the at least one network function of the mobile network, selecting by the at least one network function, the same particular network resource to be utilized for the second session for the second UE.

The first session for the first UE and the second session for the second UE may facilitate communications between the first UE and the second UE utilizing the at least one network resource as identified by the first token at the QoS level as identified by the second token.

Accordingly, utilizing techniques provided herein UE to UE communications can be provided for PDU sessions for UEs belonging a TSN by anchoring the PDU sessions on the same slice/NF instance(s) in mobile core network 120 based on the NF_TOKEN presented by each of the UEs in PDU session establishment requests and appropriate QoS levels for the PDU sessions can be assigned based on the QOS_TOKEN presented by each of the UEs in the PDU session establishment requests.

Figure 4:
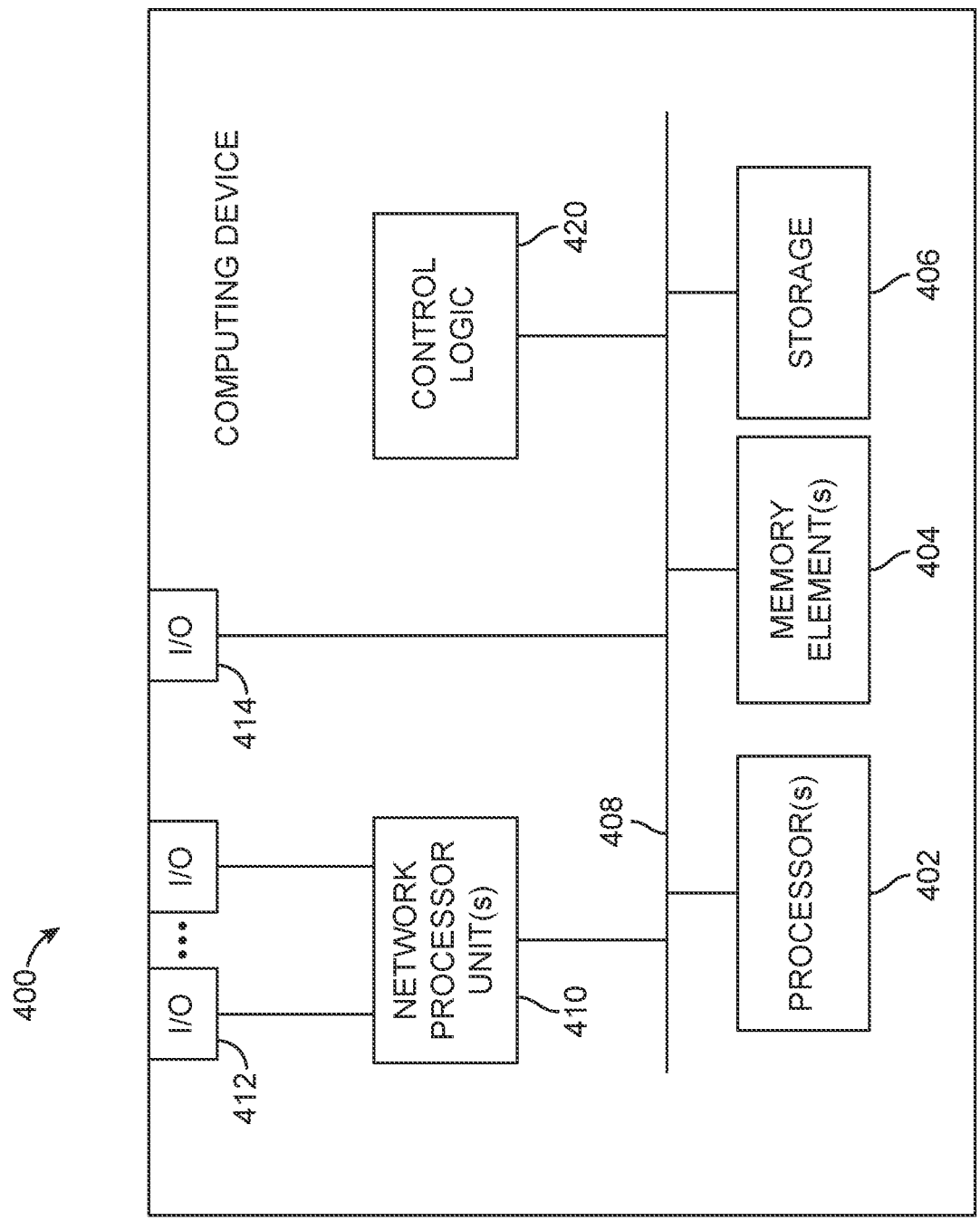
FIG. 4 is a hardware block diagram of a computing device that may perform functions associated with any combination of operations, in connection with the techniques discussed herein.

Referring to FIG. 4, FIG. 4 illustrates a hardware block diagram of a computing device 400 that may perform functions associated with operations discussed herein. In various embodiments, a computing device or apparatus, such as computing device 400 or any combination of computing devices 400, may be configured as any entity/entities as discussed herein in order to perform operations of the various techniques discussed herein, such as, for example, any of AMF 122, PCF/UDM 124, an SMF (e.g., SMF 132-1, etc.), a UPF (e.g., UPF 134-1a, etc.), an NRF, and/or any other network element discussed for embodiments herein.

In at least one embodiment, computing device 400 may be any apparatus that may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., hardware processor(s)) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communications (wired and/or wireless) between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) and/or antennas/antenna arrays now known or hereafter developed. Thus, the network processor unit(s) 410 and/or network I/O interface(s) 412 may include suitable interfaces for receiving, transmitting, and/or otherwise communicating (in a wired and/or wireless manner) data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Figure 5:
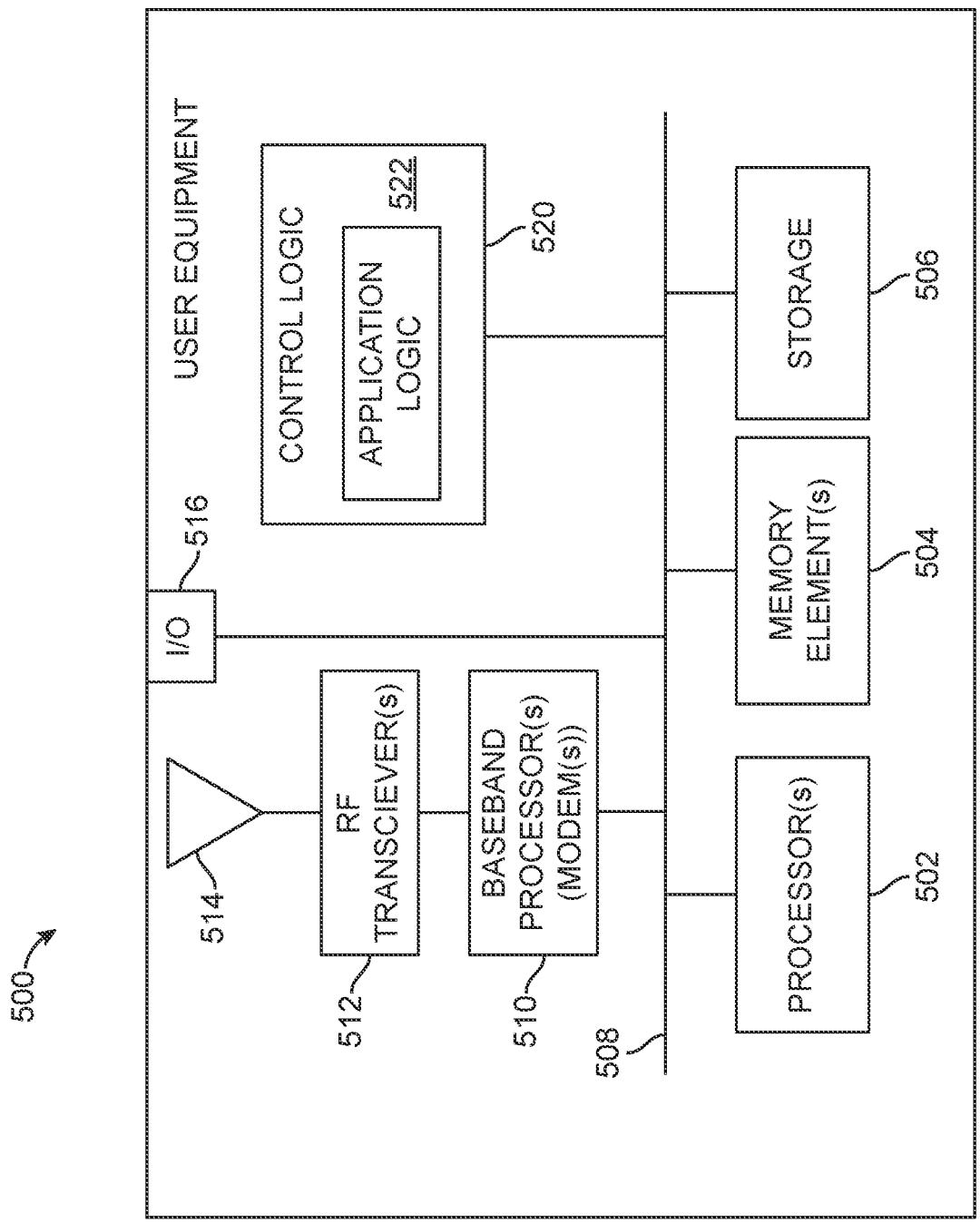
FIG. 5 is a hardware block diagram of a user equipment that may perform functions associated with any combination of operations, in connection with the techniques discussed herein.

For example, in at least one embodiment in which computing device is implemented as at least one policy function, the control logic 420 can include instructions that, when executed, cause processor(s) 402 to perform functions including provisioning a user equipment (UE) route selection policy (URSP) for each of a first UE and a second UE in which each URSP provisioned for each of the first UE and the second UE comprises: a first token that identifies at least one network resource that is to be utilized for a session for each of the first UE and the second UE; and a second token associated with a quality of service (QoS) that is to be provided for the session for each of the first UE and the second UE; upon obtaining the first token and the second token from the first UE by a mobile network, establishing a first session for the first UE utilizing the at least one network resource identified by the first token, wherein the first session for the first UE is provided a QoS level based on the second token; and upon obtaining the first token and the second token from the second UE by the mobile network, establishing a second session for the second UE utilizing the same at least one network resource that was utilized for the first session for the first UE, wherein the second session for the second UE is provided the QoS level based on the second token Referring to FIG. 5, FIG. 5 illustrates a hardware block diagram of a user equipment 500 that may perform functions associated with operations discussed herein. In various embodiments, a radio device or apparatus, such as user equipment 500 or any combination of user equipment 500, may be configured as any user equipment as depicted herein in order to perform operations of the various techniques discussed herein, such as operations that may be performed by UE 102-1 and/or UE 102-2, according to an example embodiment.

In at least one embodiment, user equipment 500 may be any apparatus that may include one or more processor(s) 502, one or more memory element(s) 504, storage 506, a bus 508, a baseband processor or modem 510, one or more radio RF transceiver(s) 512, one or more antenna(s) or antenna array(s) 514, one or more I/O interface(s) 516, and control logic 520, which may include application logic 522 for one or more application provided for the user equipment 500.

The one or more processor(s) 502, one or more memory element(s) 504, storage 506, bus 508, and I/O interface(s) 516 may be configured/implemented in any manner described herein, such as described herein at least with reference to FIG. 4.

The RF transceiver(s) 512 may perform RF transmission and RF reception of wireless signals via antenna(s)/antenna array(s) 514, and the baseband processor (modem) 510 performs baseband modulation and demodulation, etc. associated with such signals to enable wireless communications for user equipment 500.

In various embodiments, control logic 520 and application logic 522, can include instructions that, when executed, cause processor(s) 502 to perform operations, which can include, but not be limited to, providing overall control operations of user equipment 500; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420 of computing device 400 and/or control logic 520 and application logic 522 of user equipment 500) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 404 of computing device 400 and memory element(s) 504 of user equipment 500) and/or storage (e.g., storage 406 of computing device 400 and storage 506 of user equipment 500) can store data, software, code, instructions (e.g., processor instructions), logic, parameters, combinations thereof, and/or the like used for operations described herein. This includes memory element(s) 404/504 and/or storage 406/506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include provisioning a user equipment (UE) route selection policy (URSP) for each of a first UE and a second UE, wherein each URSP provisioned for each of the first UE and the second UE comprises: a first token that identifies at least one network resource that is to be utilized for a session for each of the first UE and the second UE; and a second token associated with a quality of service (QoS) that is to be provided for the session for each of the first UE and the second UE; upon obtaining the first token and the second token from the first UE by a mobile network, establishing a first session for the first UE utilizing the at least one network resource identified by the first token, wherein the first session for the first UE is provided a QoS level based on the second token; and upon obtaining the first token and the second token from the second UE by the mobile network, establishing a second session for the second UE utilizing the same at least one network resource that was utilized for the first session for the first UE, wherein the second session for the second UE is provided the QoS level based on the second token.

In various embodiments, the at least one network resource is at least one of a session management function; a user plane function; or a network slice instance for a particular network slice type. The URSP for each of the first UE and the second UE can be provisioned for each UE via a policy element (e.g., a PCF) of the mobile network. In one instance, the first token and the second token for each URSP can be provisioned for each of the first UE and the second UE prior to registration of the first UE and the second UE with the mobile network.

The URSP for each of the first UE and the second UE are associated with a particular application operating on each of the first UE and the second UE. In one instance, the method may further include provisioning an additional URSP for each of the first UE and the second UE, wherein the additional URSP is associated with a different application operating on each of the first UE and the second UE. In one instance, the first session for the first UE and the second session for the second UE facilitate communications between the first UE and the second UE utilizing the at least one network resource identified by the first token at the QoS level associated with the second token.

In one instance, establishing the first session for the first UE further comprises: upon obtaining the first token and the second token from the first UE by at least one network function of the mobile network, selecting by the at least one network function, a particular network resource to be utilized for the first session for the first UE. In one instance, establishing the second session for the second UE further comprises: upon obtaining the first token and the second token from the second UE by the at least one network function of the mobile network, selecting by the at least one network function, the same particular network resource to be utilized for the second session for the second UE. The at least one network function of the mobile network can be at least one of an Access and Mobility Management Function (AMF) or a Session Management Function (SMF).

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   provisioning each of a user equipment (UE) route selection policy (URSP) for each of a first UE and a second UE, wherein each URSP provisioned for each of the first UE and the second UE is associated with a particular application operating on each of the first UE and the second UE and comprises:
      a first token that identifies at least one network resource that is to be utilized for a session for each of the first UE and the second UE, wherein each URSP associated with the particular application that is provisioned for each of the first UE and the second UE includes the same first token; and
      a second token associated with a quality of service (QOS) that is to be provided for the session for each of the first UE and the second UE, wherein each URSP associated with the particular application that is provisioned for each of the first UE and the second UE includes the same second token;
   upon obtaining the first token and the second token from the first UE by a mobile network, establishing a first session for the first UE utilizing the at least one network resource identified by the first token, wherein the first session for the first UE is provided a QoS level based on the second token; and
   upon obtaining the first token and the second token from the second UE by the mobile network, establishing a second session for the second UE utilizing the same at least one network resource that is utilized for the first session for the first UE, wherein the second session for the second UE is provided the same QoS level, based on the second token, that is provided for the first session for the first UE.

2. The method of claim 1, wherein the at least one network resource is at least one of:
   a session management function;
   a user plane function; or
   a network slice instance for a particular network slice type.

3. The method of claim 1, wherein each URSP associated with the particular application provisioned for each of the first UE and the second UE is provisioned for each UE from a policy element of the mobile network.

4. The method of claim 1, wherein the first token and the second token for each URSP is provisioned for each of the first UE and the second UE prior to registration of the first UE and the second UE with the mobile network.

5. The method of claim 1, further comprising:
   provisioning an additional URSP for each of the first UE and the second UE, wherein the additional URSP is associated with a different application operating on each of the first UE and the second UE.

6. The method of claim 1, wherein the first session for the first UE and the second session for the second UE facilitate communications between the first UE and the second UE utilizing the same at least one network resource identified by the first token at the same QoS level associated with the second token.

7. The method of claim 1, wherein establishing the first session for the first UE further comprises:
upon obtaining the first token and the second token from the first UE by at least one network function of the mobile network, selecting by the at least one network function, a particular network resource to be utilized for the first session for the first UE.

8. The method of claim 7, wherein establishing the second session for the second UE further comprises:
upon obtaining the first token and the second token from the second UE by the at least one network function of the mobile network, selecting by the at least one network function, the particular network resource to be utilized for the second session for the second UE.

9. The method of claim 8, wherein the at least one network function of the mobile network is at least one of an Access and Mobility Management Function (AMF) or a Session Management Function (SMF).

10. The method of claim 1, wherein the first token and the second are provided for each of a route descriptor portion of each URSP provisioned for each of the first UE and the second UE.

11. The method of claim 1, wherein the first token and the second token are obtained from the first UE via a session establishment request obtained from the first UE and wherein the first token and the second token are obtained from the second UE via a session establishment request obtained from the second UE.

12. One or more non-transitory computer readable storage media encoded with instructions that, when executed by a processor, cause the processor to perform operations, comprising:
provisioning each of a user equipment (UE) route selection policy (URSP) for each of a first UE and a second UE, wherein each URSP provisioned for each of the first UE and the second UE is associated with a particular application operating on each of the first UE and the second UE and comprises:
a first token that identifies at least one network resource that is to be utilized for a session for each of the first UE and the second UE, wherein each URSP associated with the particular application that is provisioned for each of the first UE and the second UE includes the same first token; and
a second token associated with a quality of service (QOS) that is to be provided for the session for each of the first UE and the second UE, wherein each URSP associated with the particular application that is provisioned for each of the first UE and the second UE includes the same second token;
upon obtaining the first token and the second token from the first UE by a mobile network, establishing a first session for the first UE utilizing the at least one network resource identified by the first token, wherein the first session for the first UE is provided a QoS level based on the second token; and
upon obtaining the first token and the second token from the second UE by the mobile network, establishing a second session for the second UE utilizing the same at least one network resource that is utilized for the first session for the first UE, wherein the second session for the second UE is provided the same QoS level, based on the second token, that is provided for the first session for the first UE.

13. The media of claim 12, further encoded with instructions that, when executed by the processor, cause the processor to perform further operations, comprising:
provisioning an additional URSP for each of the first UE and the second UE, wherein the additional URSP is associated with a different application operating on each of the first UE and the second UE.

14. The media of claim 12, wherein the first session for the first UE and the second session for the second UE facilitate communications between the first UE and the second UE utilizing the same at least one network resource identified by the first token at the same QoS level associated with the second token.

15. The media of claim 12, wherein establishing the first session for the first UE further comprises:
upon obtaining the first token and the second token from the first UE by at least one network function of the mobile network, selecting by the at least one network function, a particular network resource to be utilized for the first session for the first UE.

16. A system comprising:
at least one memory element for storing data; and
at least one processor for executing instructions associated with the data, wherein executing the instructions causes the system to perform operations, comprising:
provisioning each of a user equipment (UE) route selection policy (URSP) for each of a first UE and a second UE, wherein each URSP provisioned for each of the first UE and the second UE is associated with a particular application operating on each of the first UE and the second UE and comprises:
a first token that identifies at least one network resource that is to be utilized for a session for each of the first UE and the second UE, wherein each URSP associated with the particular application that is provisioned for each of the first UE and the second UE includes the same first token; and
a second token associated with a quality of service (QOS) that is to be provided for the session for each of the first UE and the second UE, wherein each URSP associated with the particular application that is provisioned for each of the first UE and the second UE includes the same second token;
upon obtaining the first token and the second token from the first UE by a mobile network, establishing a first session for the first UE utilizing the at least one network resource identified by the first token, wherein the first session for the first UE is provided a QoS level based on the second token; and
upon obtaining the first token and the second token from the second UE by the mobile network, establishing a second session for the second UE utilizing the same at least one network resource that is utilized for the first session for the first UE, wherein the second session for the second UE is provided the same QoS level, based on the second token, that is provided for the first session for the first UE.

17. The system of claim 16, wherein the at least one network resource is at least one of:
a session management function;
a user plane function; or
a network slice instance for a particular network slice type.

18. The system of claim 16, wherein establishing the first session for the first UE further comprises:
upon obtaining the first token and the second token from the first UE by at least one network function of the mobile network, selecting by the at least one network function, a particular network resource to be utilized for the first session for the first UE.

19. The system of claim 18, wherein establishing the second session for the second UE further comprises:
upon obtaining the first token and the second token from the second UE by the at least one network function of the mobile network, selecting by the at least one network function, the particular network resource to be utilized for the second session for the second UE.

20. The system of claim 19, wherein the at least one network function of the mobile network is at least one of an Access and Mobility Management Function (AMF) or a Session Management Function (SMF).

\* \* \* \* \*